United States Patent [19]

Sugiyama

[11] Patent Number: 4,567,860
[45] Date of Patent: Feb. 4, 1986

[54] INTAKE SYSTEM FOR MULTIPLE CYLINDER ENGINES

[75] Inventor: Keiichi Sugiyama, Shizuoka, Japan

[73] Assignee: Yamaha Hatsudoki Kabushiki Kaisha, Iwata, Japan

[21] Appl. No.: 660,250

[22] Filed: Oct. 12, 1984

Related U.S. Application Data

[63] Continuation of Ser. No. 526,101, Aug. 24, 1983, abandoned, which is a continuation of Ser. No. 342,222, Jan. 25, 1982, abandoned.

[30] Foreign Application Priority Data

Mar. 16, 1981 [JP] Japan ................... 56-36482

[51] Int. Cl.$^4$ ........................................... F02M 35/10
[52] U.S. Cl. .................... 123/52 MC; 123/188 M; 123/193 H; 123/442
[58] Field of Search ................... 123/442, 193 H, 339, 123/437, 188 M, 308; 261/42, 23 B, 23 C

[56] References Cited

U.S. PATENT DOCUMENTS

| | | | |
|---|---|---|---|
| 2,871,001 | 1/1959 | Stoltman | 261/65 |
| 3,814,069 | 6/1974 | Croft et al. | 123/442 |
| 4,174,686 | 11/1979 | Shimizu et al. | 123/188 M |
| 4,194,474 | 5/1980 | Endo | 123/442 |
| 4,256,062 | 3/1981 | Schäfer | 123/188 M |
| 4,300,504 | 11/1981 | Tezuka | 123/442 |
| 4,308,837 | 1/1982 | Nohira et al. | 123/442 |

FOREIGN PATENT DOCUMENTS

| | | | |
|---|---|---|---|
| 0052220 | 4/1979 | Japan | 123/308 |
| 0151721 | 11/1979 | Japan | 123/442 |
| 0005446 | 1/1980 | Japan | 123/442 |

Primary Examiner—Ira S. Lazarus
Assistant Examiner—R. S. Bailey
Attorney, Agent, or Firm—Ernest A. Beutler

[57] ABSTRACT

An induction system for a multiple cylinder internal combustion engine wherein the manifold and cylinder head intake passages of the respective cylinders are divided into two parts by a partition. A load responsive throttle valve controls the flow to the induction passage parts to that the low speed charge requirements are supplied through only one part of the induction passage and the wide open charge requirements are supplied through both parts to achieve maximum power without sacrificing low speed running at a low cost.

2 Claims, 2 Drawing Figures

INTAKE SYSTEM FOR MULTIPLE CYLINDER ENGINES

BACKGROUND OF THE INVENTION

This application is a continuation of application Ser. No. 526,101, filed Aug. 24, 1983, now abandoned, which is a continuation of Ser. No. 342,222 filed Jan. 25, 1982, now abandoned.

This invention relates to an intake system for engines and more particularly to an improved induction system that permits high power output to be obtained, provides good running throughout all speed and load ranges, and which is low in production cost.

A known way of increasing the performance of an internal combustion engine is through the use of multiple intake valves. In accordance with engines of this type, separate intake passages serve each intake valve, and it has been proposed to employ a separate carburetor or separate carburetor barrel for each passage. Such engines produce a substantially greater power output than a conventional multiple cylinder engine in which a number of cylinders are served through a manifold from a single carburetor of either the single or dual barrel, staged type. However, even though a greater power output can be achieved, the complexity of such engines can add to their cost and decrease their fuel economy. Furthermore, the torque and low range performance may be deteriorated with such arrangements.

It is, therefore, a principal object of this invention to provide an engine induction system which permits greater power without a significant cost increase or without a diminution of fuel economy.

It is another object of this invention to provide an improved high efficiency, low cost induction system for an internal combustion engine.

SUMMARY OF THE INVENTION

This invention is adapted to be embodied in an induction system for an internal combustion engine having a single intake port communicating with a chamber of the engine for delivering a charge thereto. An induction passage is formed in the engine and terminates at the intake port. A partition extends along at least a portion of the length of the induction passages and divides the induction passage into first and second parts. A charge forming device is provided for delivering a fuel air charge into the induction passage upstream of the partition. Throttle valve means control the relative flow through the parts of the induction passage.

DETAILED DESCRIPTION OF THE PREFERRED EMBODIMENT

Figure 1:
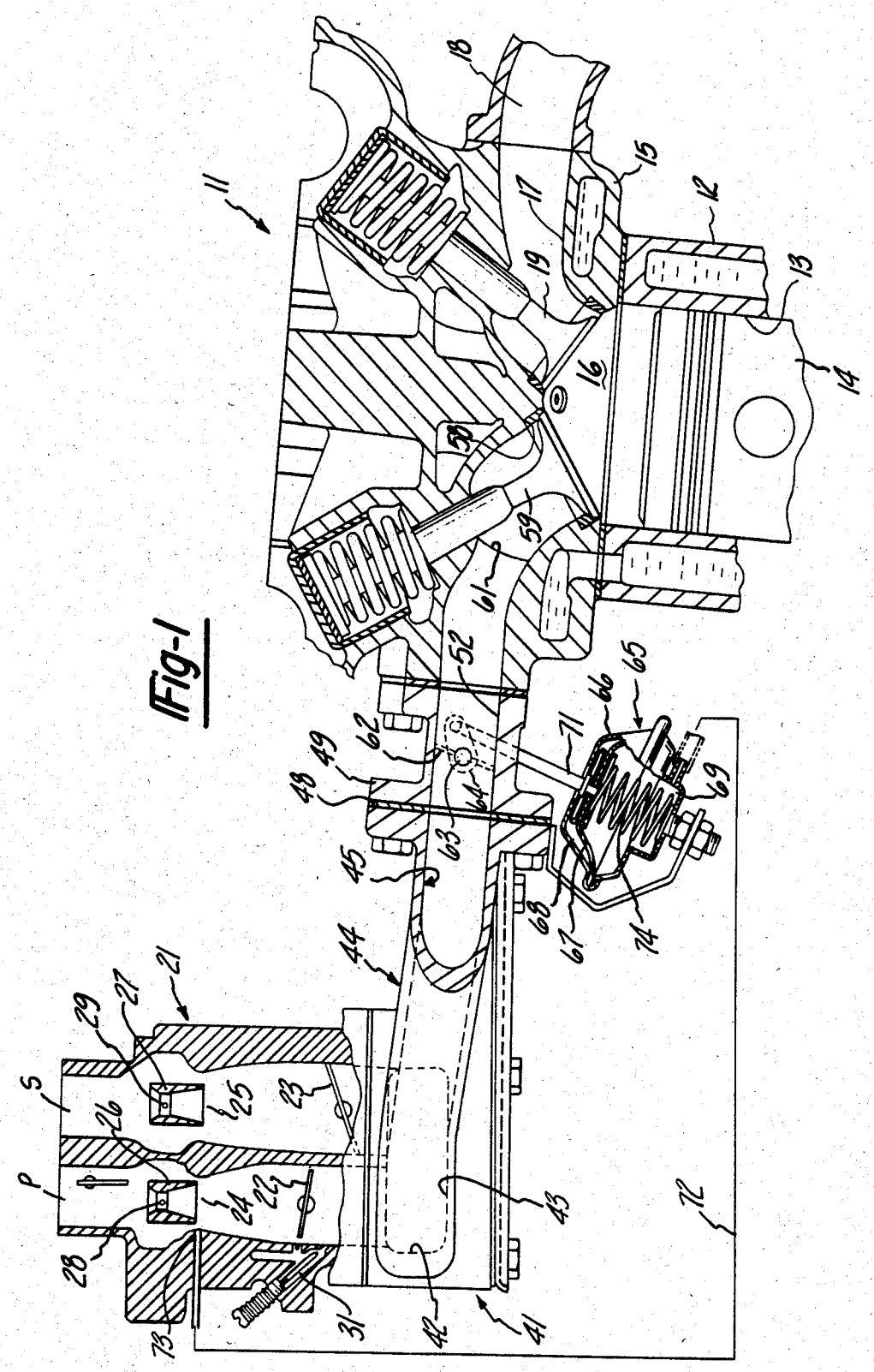
FIG. 1 is a partial cross-sectional view taken through a cylinder of a multi-cylinder internal combustion engine embodying this invention, with portions broken away.
Figure 2:
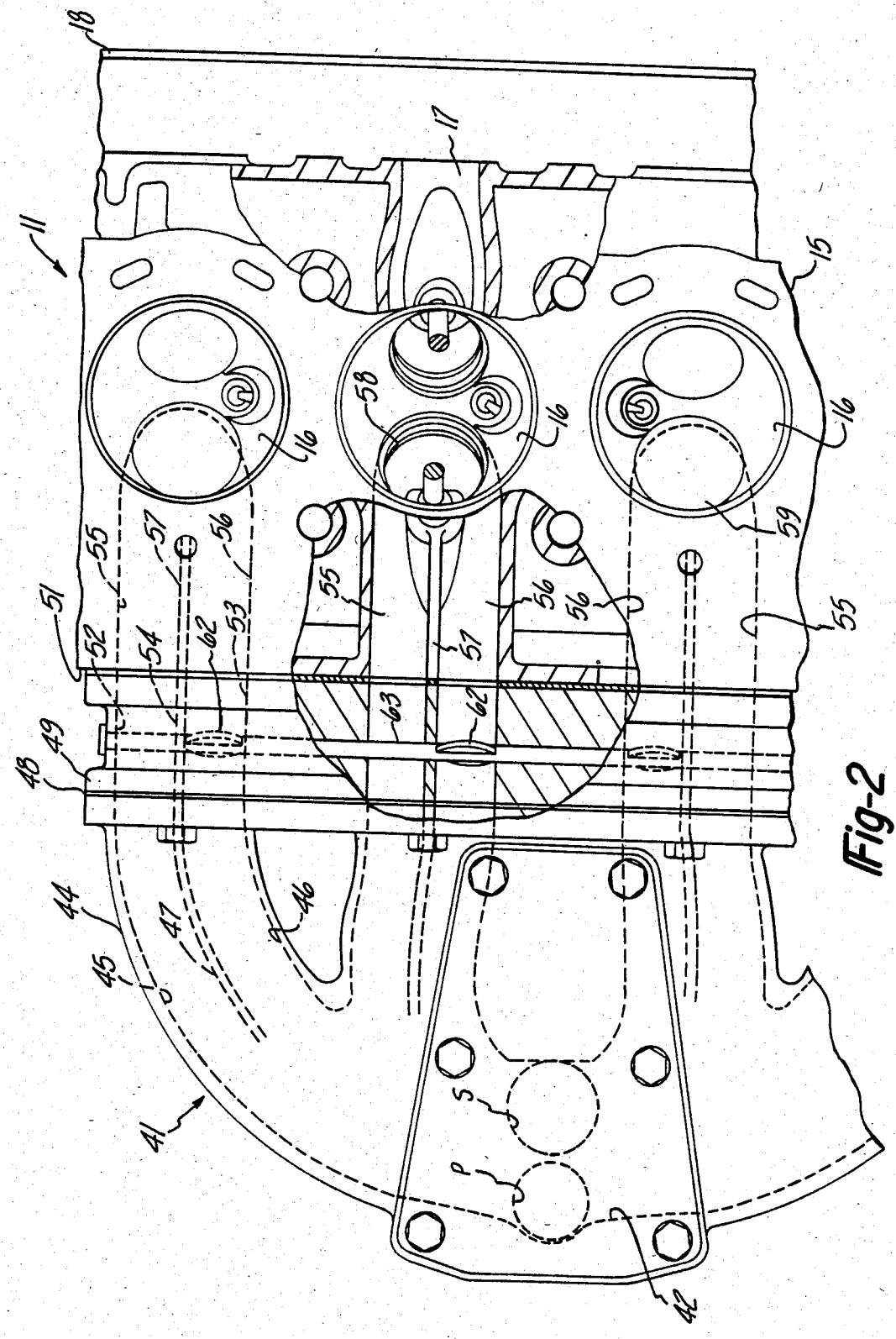
FIG. 2 is a bottom plan view of a portion of the cylinder head and intake manifold of the engine, with a portion broken away to more clearly show the construction.

In the drawings the reference numeral 11 indicates generally a 4-cycle, in-line type of internal combustion engine embodying the invention. Although the invention is described in conjunction with such an engine, it is to be understood that it may be applied to engines of other configurations, cylinder numbers or even engines of the rotary type. The invention, however, has particular utility with multi-chamber engines.

The engine 11 includes a cylinder block 12 and cylinder bores 13 in which pistons 14 are supported for reciprocation in a known manner. A cylinder head 15 is appropriately affixed to the cylinder block 12 and has cavities 16 that cooperate with the pistons 14 and cylinder bores 13 to define the engine chambers. At times the reference numeral 16 will be referred to as indicating the combustion chambers.

The cylinder head 15 is formed with exhaust passages 17 that are formed at one side thereof and which discharge from the chambers 16 into an exhaust manifold 18. Exhaust valves 19 are carried by the cylinder head 15 and control the communication between the chambers 16 and exhaust passages 17 in a known manner.

The engine 11 is provided with an induction system including a charge forming device in the form of a two-barrel staged carburetor, indicated generally by the reference numeral 21. The carburetor 21 has a primary barrel P and a secondary barrel S. A primary throttle valve 22 controls the flow through the primary barrel P and a secondary throttle valve 23 controls the flow through the secondary barrel S. As is conventional, the primary throttle valve 22 is manually controlled and the secondary throttle valve 23 is automatically controlled either by a linkage system or by means of a pressure responsive actuator for opening the secondary throttle valve 23 in staged sequence with the primary throttle valve 22. As is well known, the throttle actuator does not cause the throttle valve 23 to open until the mid range performance of the engine.

The primary and secondary barrels P and S are formed with respective main venturi sections 24, 25. Boost venturies 26, 27 are positioned in the respective main ventures 24, 25 and have fuel disharge ports 28, 29 for delivering the mid and high range fuel requirements. The primary barrel P is also provided with an idle and transmission fuel discharge circuit 31. The carburetor 21 and fuel circuits therefor are well known in this art and for that reason have not been described in any substantial detail.

An intake manifold, indicated generally by the reference numeral 41, is provided for receiving the charge supplied by the carburetor 21 and distributing it to the chambers 16. The manifold 41 is comprised or a plenum section 42 that is in direct communication with the discharge of the carburetor primary and secondary barrels P, S. A coolant heated riser 43 is positioned in heat exchanging relationship with the lower wall of the plenum section 42 and is heated to about 80° C. by the coolant of the engine so as to insure good vaporization of the fuel air mixture delivered by the carburetor 21.

The manifold 41 is formed with individual runners 44 that extend from the plenum section 42 for cooperation with the individual engine chambers 16. Each runner 44 has its respective intake passage divided into a first part 45 and a second part 46 by an internal partition or the wall 47. The wall 47 extends from an area contiguous to the plenum section 42 and terminates at a face 48 which forms the outer boundary of the manifold 41.

A valve block 49 is interposed between the manifold face 48 and a face 51 of the cylinder head 15. The valve block 49 has individual intake passages that are aligned with the passages of the runners 44 and which are divided into first and second parts 52 and 53 by means of an internal wall 54. Each wall 54 is aligned with and may be considered to be an extension of the partition 47 of each manifold runner.

The cylinder head is also provided with individual intake passages for each of the chambers 16. The portion of these passages adjacent the valve block 49 is divided into first and second portions 55, 56 by a wall or a partition 57 of the cylinder head 15 that extends from adjacent the valve block 49 to a point contiguous to but spaced from a respective intake port 58 of each chamber 16. An intake valve 59 is provided in the cylinder head 15 for controlling the flow through the respective intake port 58. The cylinder head wall 57 forms a further extension of the valve block wall 54 and manifold runner partition 47 so that the respective intake passages divided between first parts 45, 52 and 55 and separated second parts defined by the second portions 46, 53 and 56 during a major portion of their length. The cylinder head wall 57 terminates at a point spaced from the port 58, as indicated at 61, so that the respective parts may communicate with each other immediately upstream of the intake valves 59.

An arrangement is provided for preventing any substantial flow to the chambers 16 through the second intake passage parts 46, 53, 56 until the engine is operating at high speeds and high loads. To achieve this, control valves 62 are positioned in the valve block passages 53. The control valves 62 are all affixed to a common control valve shaft 63. A lever 64 is affixed to an exposed portion of the control valve shaft 63 for operating the control valves 62 in unison. The lever 64 is controlled by an actuator, indicated generally by the reference numeral 65, that is operated in response to load and speed of the engine, in a manner to be described.

The actuator 65 is comprised of a housing 66 that is divided by a diaphragm 67 into an atmospheric chamber 68 and a pressure sensing chamber 69. The diaphgram 67 is affixed to a control rod 71 which is, in turn, pivotally connected to the lever 64 for operating the control valve 62. The chamber 68 is exposed continuously to atmospheric pressure through any suitable venting passage; for example, by the clearance which extends between the actuating rod 71 and housing 66. The chamber 69 is exposed to a pressure that is determined by the air flow through the primary barrel venturi section 24. For this purpose a conduit, indicated schematically at 72, interconnects a sensing port 73 at the venturi 24 with the chamber 69. A coil spring 74 is positioned within the chamber 69 and urges the diaphragm 67 to a position wherein the control valves are closed or substantially fully closed.

OPERATION

During idle operation the primary throttle valve 22 will be in its idle position and the secondary throttle valve 23 will be substantially fully closed. Thus, the fuel air charge for the engine 11 will be supplied only from the primary barrel P of the carburetor 21. Since there is relatively low air flow through the venturi section 24 under this condition, the pressure in the actuator sensing chamber 69 will be substantially atmospheric and the spring 74 will urge the diaphragm 67 and rod 71 to a position wherein the control valve 62 will be closed. As a result, the idle charge requirements will be supplied to the chamber 16 only through the induction passages consisting of the manifold portion 45, valve block passages 52 and cylinder head passages 55. These passages define an effective cross-sectional area that is less than the maximum cross-sectional area of the induction system so that there will be a relatively high velocity of flow through the intake passages even at idle. This will insure that there is a good vaporization of the fuel air mixture and wetting of the induction passages will be reduced. Thus, variations in mixture strength are avoided and there will be good combustion in the chambers 16 and good response under acceleration.

As the manually operated throttle valve is progressively opened, there will be an increasing air flow. Eventually, there will be sufficient flow through the primary barrel P to generate sufficient vacuum at the port 73 so that the less than atmospheric pressure in the sensing chamber 69 will be such so that the atmospheric pressure in the chamber 68 overcomes the action of the spring 74 to open the control valves 62. When the control valves 62 are opened, the effective cross-sectional area of the intake system will be increased since flow can now pass through the second area intake passages defined by the partitions 46, 53 and 56. Thus, volumetric efficiency of the engine will be increased and a greater power output can be achieved.

Eventually, a point will be reached when the secondary throttle valve 23 of the carburetor 21 will be opened and the secondary barrel S will augment the fuel air flow. Of course, the point of opening of the secondary throttle valve relative to the opening of the control valves 62 can be chosen so as to provide the desired operating characteristics.

It should be readily apparent that an arrangement has been provided that will permit a high power output to be achieved without sacrificing low speed running characteristics. In addition, this is achieved through a relatively simplified arrangement which can be produced at low cost. Furthermore, the arrangement permits the use of conventional staged carburetors without necessitating multiple carburetors. Only one embodiment of the invention has been illustrated; however, it is to be understood that various changes and modifications may be made without departing from the spirit and scope of the invention as defined by the appended claims.

I claim:

1. In an internal combustion engine having a cylinder head forming at least in part a combustion chamber, a cylinder head induction passage extending through one side of said cylinder head and terminating in an intake valve seat, an intake valve supported for reciprocation by said cylinder head for controlling the flow to said combustion chamber through said induction passage, a wall extending through a portion of the length of said induction passage for dividing said passage into two portions, the cross-sectional area of each of said portions in planes perpendicular to the direction of flow through said induction passage being substantially greater than the cross-sectional area of said wall in said planes, said wall terminating at a spaced location from said valve seat to define an area disposed adjacent said valve seat where said portions may freely communicate with each other, a valve body affixed to said one side of the cylinder head and having a passage aligned with the induction passage of said cylinder head, said valve body being formed with a wall aligned with the cylinder head wall and dividing the passage of the valve body into two portions aligned with the respective portions of the cylinder head induction passage, a throttle valve supported in one of said portions for controlling the flow therethrough, and the portion of flow to said combustion chamber through said portions, said throttle valve means being effective to substantially preclude flow through said one portion for a substantial portion of the idle, low speed running condition for supply of the engine charge requirement substantially through the other of said portions during such running conditions, an intake manifold affixed to said valve body and having a runner defining a passage having its outlet end mating with said valve body passage, and a wall extending from said outlet end at least partially through said runner for dividing said intake manifold passage into two parts, said manifold wall being aligned with said valve body wall, and charge forming means for delivering a fuel air charge to said intake manifold and through said valve body and said cylinder head induction passage to said chamber.

2. A multi-cylinder internal combustion engine as set forth in claim 1 comprising a plurality of combustion chambers disposed in side by side relationships each having induction passages divided by respective walls and extending through the one side of the cylinder head, the valve body having a plurality of passages equal in number to the number of cylinder head induction passages and each divided by a respective wall, the intake manifold having a number of runners equal to the number of cylinder head induction passages and each divided by a wall, said runners extending from a common plenum chamber wherein the charge forming means delivers the fuel air charge to the intake manifold, said intake manifold runner walls terminating short of said plenum chamber.

* * * * *